United States Patent
Narayanaswami et al.

(10) Patent No.: US 7,831,675 B2
(45) Date of Patent: Nov. 9, 2010

(54) METHOD FOR INTERACTING WITH INFRASTRUCTURE DEVICES VIA INSTANT MESSAGING

(75) Inventors: Chandrasekhar Narayanaswami, Wilton, CT (US); Danny Soroker, Larchmont, NY (US); Young Sang Paik, Seoul (KR); Herbert S. McFaddin, Yorktown Heights, NY (US); Francois Huaulme, Paris (FR); Sean Lee, Tokyo (JP)

(73) Assignees: International Business Machines Corporation, Armonk, NY (US); Institute for Information Technology Advancement (KR)

( * ) Notice: Subject to any disclaimer, the term of this patent is extended or adjusted under 35 U.S.C. 154(b) by 256 days.

(21) Appl. No.: 12/016,010

(22) Filed: Jan. 17, 2008

(65) Prior Publication Data

US 2009/0187630 A1 Jul. 23, 2009

(51) Int. Cl.
*G06F 15/16* (2006.01)
(52) U.S. Cl. .................. 709/206; 709/202; 709/203; 709/204; 709/205; 709/207
(58) Field of Classification Search .......... 709/202–207
See application file for complete search history.

(56) References Cited

U.S. PATENT DOCUMENTS

| | | | |
|---|---|---|---|
| 6,449,657 | B2 | 9/2002 | Stanbach, Jr. et al. |
| 6,519,639 | B1 | 2/2003 | Glasser et al. |
| 6,549,937 | B1 | 4/2003 | Auerbach et al. |
| 6,628,770 | B1 | 9/2003 | Jain et al. |
| 6,631,412 | B1 | 10/2003 | Glasser et al. |
| 6,707,890 | B1 | 3/2004 | Gao et al. |
| 6,714,793 | B1 | 3/2004 | Carey et al. |
| 6,760,580 | B2 | 7/2004 | Robinson et al. |
| 6,813,608 | B1 | 11/2004 | Baranowki |
| 6,895,438 | B1 | 5/2005 | Ulrich |
| 6,907,447 | B1 | 6/2005 | Cooperman et al. |

(Continued)

FOREIGN PATENT DOCUMENTS

KR 1020030095581 A 12/2003

OTHER PUBLICATIONS

PCT Search Report for PCT/US 08/84118 Mailed Jan. 12, 2009.

(Continued)

*Primary Examiner*—Vivek Srivastava
*Assistant Examiner*—Thomas Duong
(74) *Attorney, Agent, or Firm*—Cantor Colburn LLP; Kenneth Corsello

(57) ABSTRACT

Exemplary embodiments of the present invention relate to a method for interacting with and controlling infrastructure devices within an IM environment. The method comprises registering at least one infrastructure device at an IM server, registering at least one computing device at the IM server, and delivering one or more of infrastructure device characteristics, status information, and service information from a registered infrastructure device to the IM server, wherein the IM server is configured to publish and update the infrastructure device characteristics, status information, and service information from the at least one registered infrastructure device to registered computing devices. The method also comprises maintaining and displaying a contact list at an IM client application executing at a registered computing device, wherein the contact listing is populated with a listing of registered infrastructure devices and the infrastructure device characteristics, status information, and service information that is associated with the infrastructure device.

25 Claims, 3 Drawing Sheets

U.S. PATENT DOCUMENTS

| | | | |
|---|---|---|---|
| 6,965,886 B2 | 11/2005 | Govrin et al. | |
| 6,976,086 B2 | 12/2005 | Sadeghi et al. | |
| 7,010,110 B2 | 3/2006 | Jorasch et al. | |
| 7,013,290 B2 | 3/2006 | Ananian | |
| 7,020,480 B2 | 3/2006 | Coskun et al. | |
| 7,051,036 B2 | 5/2006 | Rosnow et al. | |
| 7,069,009 B2 | 6/2006 | Li et al. | |
| 7,082,418 B2 | 7/2006 | Levy et al. | |
| 7,088,995 B2 | 8/2006 | Rao | |
| 7,089,590 B2 | 8/2006 | Judge et al. | |
| 7,095,829 B2 | 8/2006 | Claudatos et al. | |
| 7,110,514 B2 | 9/2006 | Brown et al. | |
| 7,113,803 B2 | 9/2006 | Dehlin | |
| 7,127,685 B2 | 10/2006 | Canfield et al. | |
| 7,181,519 B2 | 2/2007 | Pillai et al. | |
| 7,185,116 B2 | 2/2007 | Apfel et al. | |
| 7,200,413 B2 | 4/2007 | Montemer et al. | |
| 7,224,778 B2 | 5/2007 | Aoki | |
| 7,231,035 B2 | 6/2007 | Walker et al. | |
| 7,260,201 B2 | 8/2007 | Jorasch et al. | |
| 7,356,565 B2 * | 4/2008 | Zimmermann et al. | 709/206 |
| 7,593,984 B2 * | 9/2009 | Morris | 709/203 |
| 7,596,599 B1 * | 9/2009 | Maghsoodnia et al. | 709/206 |
| 7,610,343 B2 * | 10/2009 | Ikezawa et al. | 709/206 |
| 2004/0039629 A1 | 2/2004 | Hoffman et al. | |
| 2005/0130641 A1 | 6/2005 | Scott | |
| 2006/0031293 A1 | 2/2006 | Thommes et al. | |
| 2006/0093125 A1 * | 5/2006 | Dezonno | 379/265.03 |
| 2006/0167977 A1 * | 7/2006 | Wu et al. | 709/203 |
| 2006/0190531 A1 | 8/2006 | Mihaylo et al. | |
| 2006/0245391 A1 * | 11/2006 | Vaidya et al. | 370/329 |
| 2006/0271696 A1 * | 11/2006 | Chen et al. | 709/229 |
| 2007/0033252 A1 | 2/2007 | Combest | |
| 2007/0121867 A1 * | 5/2007 | Ozugur et al. | 379/201.1 |
| 2008/0229304 A1 * | 9/2008 | Bengtsson et al. | 717/178 |
| 2008/0320082 A1 * | 12/2008 | Kuhlke et al. | 709/205 |
| 2009/0006528 A1 * | 1/2009 | Batni et al. | 709/203 |

OTHER PUBLICATIONS

Patentability Report & Written Opinion for International Application No. PCT/US2008/084118 with International Filing Date Nov. 20, 2008.

* cited by examiner

METHOD FOR INTERACTING WITH INFRASTRUCTURE DEVICES VIA INSTANT MESSAGING

BACKGROUND OF THE INVENTION

1. Field of the Invention

This invention relates to instant messaging enabled device usage, and particularly to the interacting with and controlling of infrastructure devices within an instant messaging environment.

2. Description of Background

Typically, instant messaging (IM) systems require the use of an IM client program to facilitate instant messaging service operations wherein individuals are capable of textually communicating in real time. Conventionally, an IM system comprises a network of IM client devices, the IM clients being networked via an IM server or a network of IM servers. A functional aspect provided by most IM clients is the ability to track and display to a client user the network presence information in regard to individuals that are maintained within an IM client's displayed contact list (frequently referred to as a "buddy list" or "buddy group"). In operation, an IM client user selects contacts (buddies) and assigns the contacts to the contact list (buddy list/group). When a respective contact is online, the contact is automatically advertised to the IM client as being available for IM communication. Accordingly, when the IM client user is online their presence is also advertised to any contacts on whose list that their contact information resides.

Additionally, within contemporary business enterprise infrastructures there are several zones, or spaces, within the physical environments of a business enterprise that contain various programmable networked devices (e.g., such as intelligent appliances, display screens, printing devices, etc.). The generic interactions with such networked devices via a user's personal computing device are encouraged as unit control and productivity solutions.

SUMMARY OF THE INVENTION

The shortcomings of the prior art are overcome and additional advantages are provided through the provision of a method for interacting with and controlling infrastructure devices within an instant messaging (IM) environment. The method comprises registering at least one infrastructure device at an IM server, registering at least one computing device at the IM server, wherein the computing device is configured to execute an IM client application, and delivering one or more of infrastructure device characteristics, status information, and service information from a registered infrastructure device to the IM server, wherein the IM server is configured to publish and update the infrastructure device characteristics, status information, and service information from the at least one registered infrastructure device to registered computing devices.

The method also comprises maintaining a contact list at an IM client application executing at a registered computing device, wherein the contact listing is populated with a listing of registered infrastructure devices and the infrastructure device characteristics, status information, and service information that is associated with the infrastructure device, and displaying the contact list to a registered computing device user at the registered computing device.

Computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

Exemplary embodiments of the present invention provide a solution to enable an interaction framework that is based upon IM technologies. As such, the exemplary embodiments extend the notions and affordances of IM chat sessions to interactions between a computing device user and infrastructure devices. As presently utilized, infrastructure devices are networked devices (e.g., display devices, printers, kiosks, etc.) that can be comprised within a facility (e.g., a business enterprise, classroom, office environment, etc.). A computing device user's IM contact list will be populated with available infrastructure devices—the infrastructure devices being displayed as contacts or "buddies." Further, the services and availability status of an infrastructure device are displayed to the user. Yet further, the initiation of an IM chat session by a user with a respective infrastructure device corresponds to an interaction between the user on his personal computing device and the infrastructure device.

Within further exemplary embodiments, in the event that an IM chat session is initiated by a user via a personal mobile computing device, infrastructure device listing within the displayed contact list may dynamically appear on the contact list and disappear from the contact list based on the user's physical location, and possibly additional context information. The advertising of infrastructure devices in the user's vicinity and subsequent masking of infrastructure devices that are outside of the user's vicinity on the user's contact list is facilitated via an IM server.

Within exemplary embodiments, infrastructure devices register their location with the IM server and periodically transmit status information (e.g., service, availability, etc.) to the IM server. The IM server relays this information to user's who have the infrastructure device displayed on their contact lists. The user may then select any infrastructure device displayed on his contact list, just as she would chose a friend from her contact list, and determine the status of the device in addition to initiating an interactive chat service session with the device.

Figure 1:
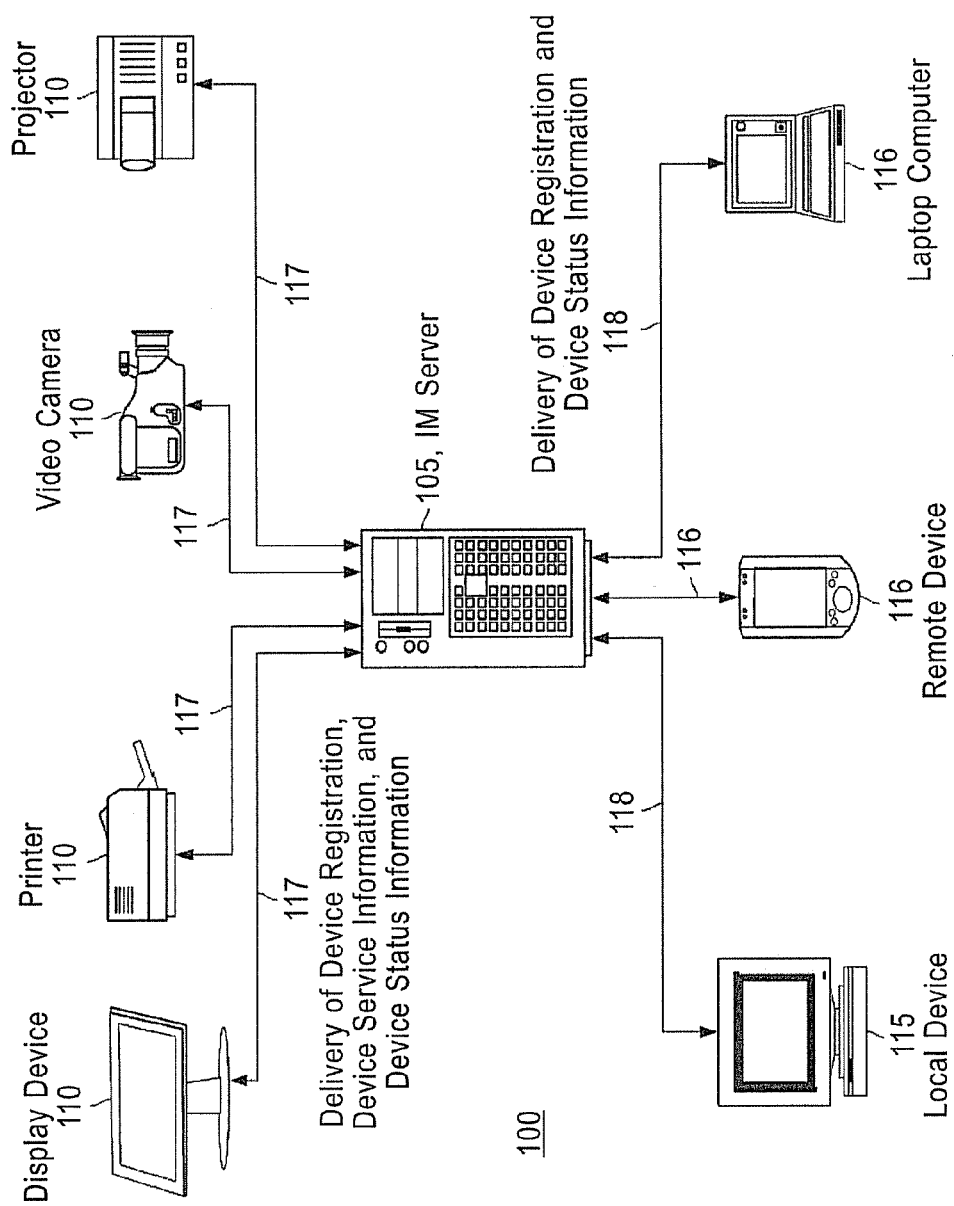
FIG. 1 illustrates one example of a system for interacting with infrastructure devices within an IM environment in accordance with exemplary embodiments of the present invention.

Turning now to the drawings in greater detail, it will be seen that in FIG. 1 there is an exemplary system 100 that provides for the interaction with infrastructure devices via IM. The system comprises an IM server 105 executing an IM application, a plurality of infrastructure devices 110 (a display device, a printer, a video camera, and a projector), and a plurality of computing devices comprising a local computing device 115 and portable computing devices 116 (a PDA enabled smart phone and a wireless networked laptop computer), each device executing an IM client application.

Within exemplary embodiments of the present invention an infrastructure device can comprise any networked device (e.g., a display/monitor, a printer, a kiosk, an ATM, a network storage device, etc.) that is configured as part of a infrastructure (e.g., a workplace such as an office or laboratory, a business enterprise location, a classroom, a shopping mall, a sports stadium, a transportation hub, a private home, etc.). A local computing device 115 can comprise any conventional personal computing system, while a portable computing device can comprise any mobile computing device with a display screen (e.g., such as a laptop computer or smart phone).

Infrastructure devices that are desired to be advertised within an IM environment must register with the IM server 105. Each infrastructure device 110 that is registered delivers registration information 117 to the IM server 105 comprising a device 110 identifier, information pertaining to services that can be provided by the device 110, and availability information in regard to the device's 110 capacity to provide services. The device 110 availability information is periodically updated at the IM server 105 by the device 110 at predetermined or operational specific time intervals.

The user computing devices (115, 116) must also register with the IM server 105 prior to being granted the capability to interact with infrastructure devices 110. As such, the user computing device (115, 116) deliver device registration information 118 to the IM server 105 comprising device identification information in addition to operational status information pertaining to the computing device (115, 116). The operational status information is periodically updated at the IM server 105 by the computing device (115, 116) at predetermined or operational specific time intervals.

Figure 2:
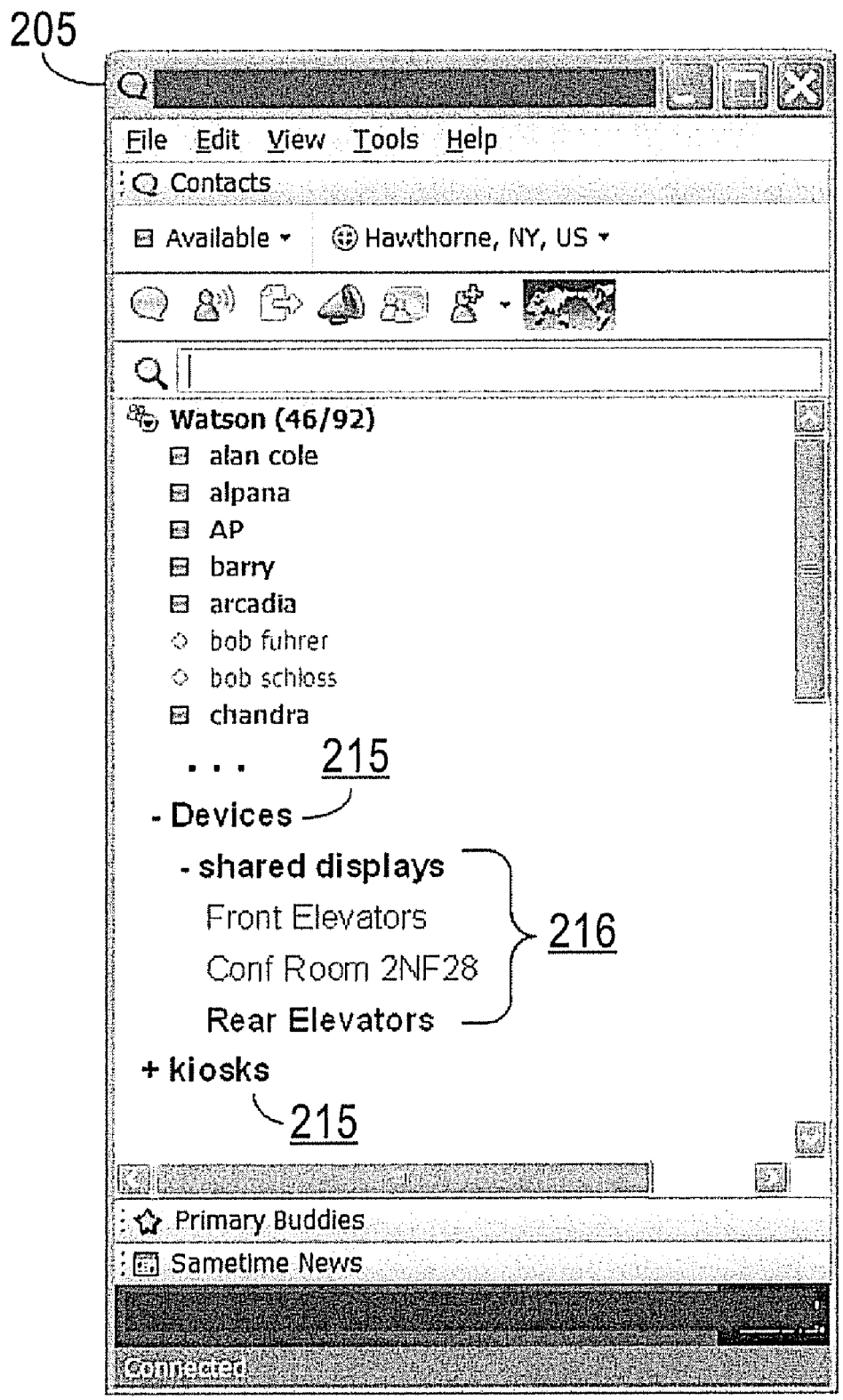
FIG. 2 illustrates one example of an IM client application GUI display window in accordance with exemplary embodiments of the present invention.

Upon receiving the registration information from an infrastructure device 110, the presence of the infrastructure device 110 can be published by populating the IM contact list 205 (FIG. 2) of a registered computing device (115, 116) along with a device category identifier 215 with an identifier 216 that is associated with the infrastructure device 110 (e.g., a name for the device, the make and model nomenclature for the device, the location of the device, etc.). The IM server 105 also publishes the availability status and location 216 (FIG. 3) of the published infrastructure device 110 to be displayed within the IM contact list that is displayed at the computing device (115, 116), in addition to any available services that the infrastructure device 100 can perform upon a user's request.

For example, assume that a plurality of display infrastructures devices 110 identifiers are populated within a displayed contact list 205 to a user at a computing device (115, 116).

Figure 3:
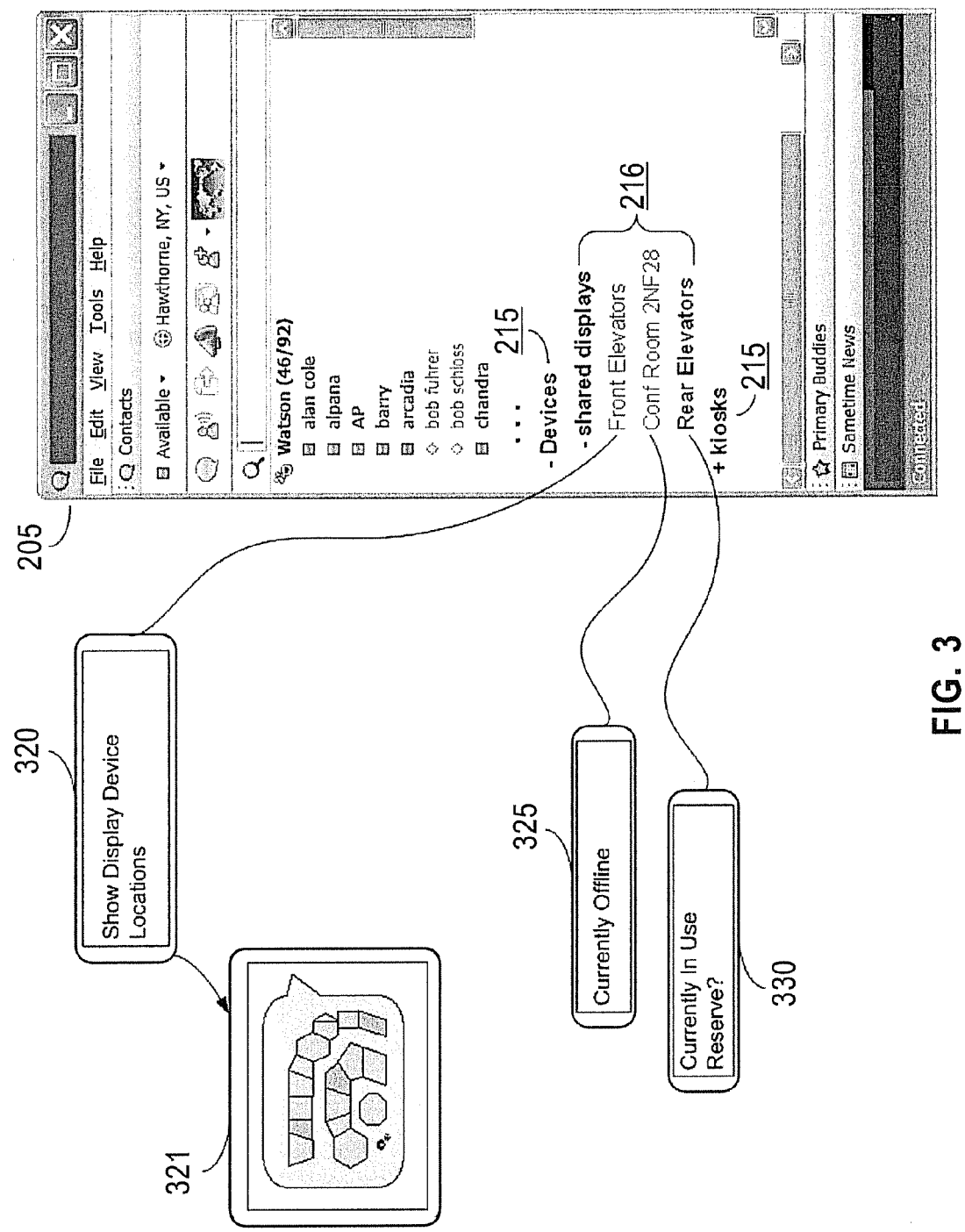
FIG. 3 illustrates one example of an IM client application GUI display window displaying a la listing of available infrastructure devices and device status information that is associated with the respective infrastructure devices in accordance with exemplary embodiments of the present invention.

The user, by selecting an identifier that is associated with a display, the user may access information that has been associated with the display infrastructure device 110 (e.g., information pertaining to the infrastructure device's display resolution, software capabilities, the location of the display, etc.). As shown in FIG. 3, the locations of a plurality of display devices are identified within the contact list 205 by their respective locations 216 within a facility. As such, each display device can be accessed in order to obtain information that has been further associated with a particular display device. The respective locations of the available display devices can be obtained by the user selecting the shared displays identifier 216, wherein thereafter the user is presented with a chat session window 320 presenting a an option to the user to view the locations of the display devices. Upon the users acceptance of the view option a map 321 detailing the respective locations of available display devices is displayed to the user.

As shown in FIG. 3, the display device that is located within the Conference Room 2NF28 currently reports an operational status of being offline 325, while the display device located at the rear elevators reports an operational status of being currently in use 330. However, even though the display device situated at the rear elevators is currently in use, a user is still provided with the option of reserving the device 110 for a future use 330. Additional dynamic information that can be accessed for a contact listing can also include the amount of time for which the device 110 is likely to be busy and unavailable if the device 110 is engaged in another IM service session.

In the instance that a displayed infrastructure device 110 identifier is associated with a printer, a computing device user (115, 116) can select an image to print and then send it to the printer that is displayed at her contact list 205. The options that are displayed when the user selects an infrastructure device 110 device would be specific to the device 110. Thus, a printer may show the various paper sizes that can be used with the printer in addition to the current status of the device 110. In the event that an infrastructure device 110 is not available then the infrastructure device 110 device is down it may suggest that an alternative infrastructure device 110 within the user's vicinity may be utilized.

Within further exemplary embodiments, a user can select multiple infrastructure device 110 contacts at once and enable sequential or multi-way communication with each infrastructure device 110. For example, selecting a display and a printer device 110 could allow the user to first view a file on a large display and then print the file out at the printer. In other cases multi-way communication is implemented. For example the user may simultaneously select three displays devices 110 from a contact list 205 in order to indicate that he is willing to use the first of the three devices 110 that becomes available, therefore, initiating an IM communication service session among the three displays and the user.

Within yet further exemplary embodiments, an owner of an infrastructure device 110 can set policies regarding who is allowed to access an infrastructure device 110 device via a contact listing mechanism. For example, an airport may require that potential infrastructure device 110 users submit a credential such as a valid ticket to be able to access a display device located within a waiting lounge. These permissions could serve for specific or indefinite time durations.

The status and functions that an infrastructure device 110 reveals to a user is entirely flexible and programmable. A specification mechanism and functional interface can be used to describe the functions and then invoke them. For example, an X-ray machine may expose functions such as those which configure the machine for a chest x-ray or a knee x-ray. These functions are available to a user by just selecting an option displayed at the contact list. Yet further, a projector display could expose methods to configure its resolution, a printer could expose the types of paper it can print on and the duplex options, or an air conditioning system might allow the user to view the current temperature and air humidity levels or allow the user the set those parameters.

Within exemplary embodiments the infrastructure devices 110 that are displayed within a contact list 205 are placed within logical group listings (e.g., by device type, device location, etc.). Infrastructure devices can also be listed according to predetermined ranking and prioritization criteria. In further exemplary embodiments the order the order of infrastructure device 110 contact listing is determined by the physical proximity between a computing device (115, 116) user and an infrastructure device 110.

Interaction service sessions between a computing device (115, 116) user and an infrastructure device 110 are modeled upon conventional IM chat sessions. As such, a computing device (115, 116) user establishes an infrastructure device 110 interaction service session by selecting the displayed identifier for an infrastructure device 110 from the IM contact list. Further, any specific services actions that are required of the infrastructure device 110 can be initiated by the computing device (115, 116) user by the user's selection of the desired service from the contact listing that is associated with the infrastructure device 110. Within further exemplary embodiments infrastructure devices 110 and computing devices (115, 116) are required to present security tokens to the other IM service session partner before an active or potential IM association can be created.

Each infrastructure device 110 further comprises a software agent (not shown) that is in communication with the IM server 105, and the IM client on a user's computing device (115, 116) is specifically enhanced for interactive interaction with infrastructure devices 110. Further exemplary embodiments comprise advance IM features such as camping (i.e., the notification of a user that a previously unavailable contact is presently available). Within exemplary embodiments, a user may specify camp setting conditions (e.g., certain infrastructure device characteristics, status information, service information, etc.) which generate an alarm application on the computing device that notifies the user when a specific infrastructure device 110 has satisfied the notification conditions in order for the user to initiate a service session with the infrastructure device 110. Additionally, a services session can automatically be initiated upon the triggering of an alarm condition.

In particular, since some infrastructure devices 110 may be configured to only accommodate a single interaction service session at a time (e.g., possibly use of a large shared screen), whereas other infrastructure devices 110 may accommodate parallel service sessions, a user's position in regard to interacting with an infrastructure device 110 can be shown by displaying an indicator that shows a user's position in a service queue for a particular infrastructure device 110. Yet further, the notion of a chat room for multi-device interaction is extended to accommodate interaction service sessions involving multiple infrastructure devices 110 (e.g., an interaction service session that involves the usage a projector and an audio system for a presentation).

A computing device (115, 116) user can further interact with an infrastructure device 110 using an IM GUI chat window. Typically the commands entered by the user may be selected from a human understandable command set exposed via the chat session or in free form text. For example a command could resize the print size in a photo printer. Within this exemplary embodiment a user can deliver commands to an infrastructure device 110, wherein the commands are interpreted by the agent that is executing at the infrastructure device 110. Within further exemplary embodiments the commands can be encoded in a mark up language (e.g., such as XML). Additionally, a computing device (115, 116) user can obtain detailed status information in regard to a particular infrastructure device 110 (e.g., the amount of memory available on a device, or if the device is a printer then the amount of color toner that is still remaining on the device, etc.).

Within yet further exemplary embodiments, a computing device user may initiate and pay for specific operational interactions at an infrastructure device 110 using specific payment commands that are configured for respective infrastructure devices. As such, the agent on the infrastructure device 110 can validate the payment that is submitted by the computing device 110 user. Standard forms of electronic payment can be utilized in conjunction with the exemplary embodiments of the present invention (e.g., paying by credit or debit cards, store cards, etc.). Alternatively a computing device (115, 116) user could pay by other means such as physically depositing cash in infrastructure device 110 or by swiping a card reader in communication with the infrastructure device.

Within additional exemplary embodiments the contact list 205 is populated with infrastructure devices that are within a predetermined physical proximity of the registered computing device. That is, a user has access from a local computing device 115 that is physically situated in a predetermined distance from a respective infrastructure device 110 or the user is utilizing a mobile computing device 116, wherein the user physically carries the mobile computing device 116 into and away from the predetermined physically proximity of the infrastructure device 110. The physical location of all infrastructure devices 110 and local computing devices 115 are reported by the devices (110, 115) to the IM server 105.

The physical location of any mobile computing devices 116 is determined (e.g., by the use of GPS, RFID transponder localization, or radio frequency signal triangulation, user manual input, etc.) and periodically or continually reported to the IM server. As such, infrastructure devices that the user moves the mobile computing device 116 in proximity to are automatically displayed in the contact list 205 and in the instance that the mobile computing device 116 user exits the predetermined physical proximity of an infrastructure device 110 the identifier for the infrastructure device 110 is removed from the displayed contact listing 205.

Within additional exemplary embodiments, a user may correspond with the IM server 105 and search for certain classes of infrastructure devices 110 (e.g., displays, elevators, etc.). The user location is conveyed to the IM server 105, wherein thereafter the IM server responds to the user request with a listing of infrastructure devices 110 situated near the user's position.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for interacting with and controlling infrastructure devices within an instant messaging (IM) environment, the method comprising:
    registering at least one infrastructure device at an IM server;
    registering at least one computing device at the IM server, wherein the computing device is configured to execute an IM client application;
    delivering one or more of infrastructure device characteristics, status information, and service information from a registered infrastructure device to the IM server, wherein the IM server is configured to publish and update the infrastructure device characteristics, status information, and service information from the at least one registered infrastructure device to registered computing devices;
    maintaining a contact list at an IM client application executing at a registered computing device, wherein the contact listing is populated with a listing of registered infrastructure devices and the infrastructure device characteristics, status information, and service information that is associated with the infrastructure device;
    displaying the contact list to a registered computing device user at the registered computing device;
    organizing a priority of each of the registered infrastructure devices within the contact list, the priority based on at least one of a predetermined ranking, predetermined prioritization criteria, a class of device, and a predetermined proximity to the registered computing device; and
    changing the priority of each of the registered infrastructure devices within the contact list, based on the predetermined proximity to the registered computing device, in response to a change of the predetermined proximity of one or more of the registered infrastructure devices with respect to a location of the registered computing device.

2. The method of claim 1, wherein a service session is established with one or more registered infrastructure devices by selecting the infrastructure devices from the contact list maintained within the IM client application executed on a registered computing device.

3. The method of claim 2, further comprising configuring an infrastructure device to offer services to a computing device via service sessions, wherein a services session can include more than one computing device and infrastructure device.

4. The method of claim 2, further comprising ranking and prioritizing the infrastructure devices that are comprised within the contact list.

5. The method of claim 1, further comprising selecting at least one infrastructure device specific service from the contact list displayed at the computing device in order to initiate an interactive chat service session with the at least one infrastructure device.

6. The method of claim 1, further comprising populating the contact list at the registered computing device with infrastructure devices that are within a predetermined physical proximity of the registered computing device.

7. The method of claim 6, further comprising removing an infrastructure device from the contact list at the registered computing device in the instance that the registered computing device is no longer within the predetermined physical proximity of the infrastructure device.

8. The method of claim 6, wherein the physical location of the computing devices or infrastructure devices is determined by user input delivered to the IM server.

9. The method of claim 6, wherein the physical location of the computing device or infrastructure device is determined via one or a combination of GPS, RFID transponder localization, or radio frequency signal triangulation.

10. The method of claim 1, further comprising setting conditions which generate an alarm application on the computing device when the infrastructure device characteristics, status information, and service information satisfy the conditions.

11. The method of claim 10, wherein a services session is started automatically by the triggering of an alarm condition.

12. The method of claim 1, wherein the infrastructure devices can specify conditions under which the IM server can deliver information about the infrastructure device characteristics, status information, and service information to computing devices.

13. The method of claim 1, wherein the computing device can specify conditions in regard to which infrastructure devices are included in the contact list.

14. The method of claim 1, further comprising the computing devices and the infrastructure devices presenting a security token to the IM server prior to the devices being registered at the IM server.

15. A computer program product that includes a computer readable medium useable by a processor, the medium having stored thereon a sequence of instructions which, when executed by the processor, causes the processor to interact with and control a computing device that has been registered within an instant messaging (IM) environment, by:
    configuring the computing device to execute an IM client application;
    transmitting registration information to an IM server;
    maintaining a contact list at an IM client application executing at a registered computing device, wherein the contact listing is populated with a listing of registered infrastructure devices and the infrastructure device characteristics, status information, and service information that is associated with the infrastructure device;
    displaying the contact list to a registered computing device user at the registered computing device;
    organizing a priority of each of the registered infrastructure devices within the contact list, the priority based on at least one of a predetermined ranking, predetermined prioritization criteria, a class of device, and a predetermined proximity to the registered computing device; and
    changing the priority of each of the registered infrastructure devices within the contact list, based on the predetermined proximity to the registered computing device, in response to a change of the predetermined proximity of one or more of the registered infrastructure devices with respect to a location of the registered computing device.

16. The computer program product of claim 15, wherein a service session is established with one or more registered infrastructure devices by selecting the infrastructure devices from the contact list maintained within the IM client application executed on a registered computing device.

17. The computer program product of claim 16, further comprising populating the contact list at the registered computing device with infrastructure devices that are within a predetermined physical proximity of the registered computing device.

18. The computer program product of claim 17, further comprising removing an infrastructure device from the contact list at the registered computing device in the instance that the registered computing device is no longer within the predetermined physical proximity of the infrastructure device.

19. The computer program product of claim 16, further comprising setting conditions which generate an alarm application on the computing device when the infrastructure device characteristics, status information, and service information satisfy the conditions.

20. The computer program product of claim 19, wherein a services session is started automatically by the triggering of an alarm condition.

21. The computer program product of claim 16, further comprising the computing devices and the infrastructure devices presenting a security token to the IM server prior to the devices being registered at the IM server.

22. A computer program product that includes a computer readable medium useable by a processor, the medium having stored thereon a sequence of instructions which, when executed by the processor, causes the processor to interact with and control an infrastructure device that has been registered within an instant messaging (IM) environment, by:

transmitting registration information to an IM server;

delivering one or more of infrastructure device characteristics, status information, and service information from a registered infrastructure device to the IM server, wherein the IM server is configured to publish and update the infrastructure device characteristics, status information, and service information from the at least one registered infrastructure device to registered computing devices, each of the registered computing devices having a contact list organizing a priority of the at least one registered infrastructure device within the contact list, the priority based on at least one of a predetermined ranking, predetermined prioritization criteria, a class of device, and a predetermined proximity of the registered infrastructure device to each of the registered computing devices; and changing the priority of the registered infrastructure devices within the contact lists, based on the predetermined proximity to the registered computing devices, in response to a change of the predetermined proximity of the registered infrastructure device with respect to a location of each of the registered computing devices.

23. The computer program product of claim 22, further comprising configuring an infrastructure device to offer services to a computing device via service sessions, wherein a services session can include more than one computing device and infrastructure device.

24. The computer program product of claim 22, wherein the infrastructure devices can specify conditions under which the IM server can deliver information about the infrastructure device characteristics, status information, and service information to computing devices.

25. The method of claim 22, further comprising the computing devices and the infrastructure devices presenting a security token to the IM server prior to the devices being registered at the IM server.

* * * * *